(12) United States Patent
Fayyad et al.

(10) Patent No.: US 6,263,334 B1
(45) Date of Patent: Jul. 17, 2001

(54) DENSITY-BASED INDEXING METHOD FOR EFFICIENT EXECUTION OF HIGH DIMENSIONAL NEAREST-NEIGHBOR QUERIES ON LARGE DATABASES

(75) Inventors: Usama Fayyad, Mercer Island, WA (US); Kristin P. Bennett, Troy, NY (US); Dan Geiger, Tivon (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/189,229

(22) Filed: Nov. 11, 1998

(51) Int. Cl.$^7$ ..................................................... G06F 17/30
(52) U.S. Cl. ..................................... 707/5; 704/9; 706/50; 707/6; 707/100; 707/102; 709/202
(58) Field of Search ..................................... 707/5, 6, 100, 707/101, 200, 102; 704/9, 222, 233, 245; 706/45, 50; 705/1, 10, 27; 702/179; 709/202

(56) References Cited

U.S. PATENT DOCUMENTS

| | | | |
|---|---|---|---|
| 5,325,298 | * 6/1994 | Gallant | 704/9 |
| 5,590,242 | * 12/1996 | Juang et al. | 704/245 |
| 5,781,704 | * 7/1998 | Rossmo | 706/45 |
| 5,787,422 | 7/1998 | Tukey et al. . | |
| 5,790,426 | * 8/1998 | Robinson | 702/179 |
| 5,832,182 | * 11/1998 | Zhang et al. | 706/50 |
| 5,884,282 | * 3/1999 | Robinson | 705/27 |

FOREIGN PATENT DOCUMENTS 797 161 A2  9/1997  (EP) .

OTHER PUBLICATIONS

Kleinberg, Jon M., "Two Algorithms for Nearest–Neighbor Search in High Dimensions", Proceedings of the twenty–ninth annual ACM symposium on Theory of Computing, May 4–6, 1997, pp. 599–608.*

(List continued on next page.)

*Primary Examiner*—Kim Vu
*Assistant Examiner*—Shahid Alam
(74) *Attorney, Agent, or Firm*—Watts, Hoffmann, Fisher & Heinke, Co., L.P.A.

(57) ABSTRACT

Method and apparatus for efficiently performing nearest neighbor queries on a database of records wherein each record has a large number of attributes by automatically extracting a multidimensional index from the data. The method is based on first obtaining a statistical model of the content of the data in the form of a probability density function. This density is then used to decide how data should be reorganized on disk for efficient nearest neighbor queries. At query time, the model decides the order in which data should be scanned. It also provides the means for evaluating the probability of correctness of the answer found so far in the partial scan of data determined by the model. In this invention a clustering process is performed on the database to produce multiple data clusters. Each cluster is characterized by a cluster model. The set of clusters represent a probability density function in the form of a mixture model. A new database of records is built having an augmented record format that contains the original record attributes and an additional record attribute containing a cluster number for each record based on the clustering step. The cluster model uses a probability density function for each cluster so that the process of augmenting the attributes of each record is accomplished by evaluating each record's probability with respect to each cluster. Once the augmented records are used to build a database the augmented attribute is used as an index into the database so that nearest neighbor query analysis can be very efficiently conducted using an indexed look up process. As the database is queried, the probability density function is used to determine the order clusters or database pages are scanned. The probability density function is also used to determine when scanning can stop because the nearest neighbor has been found with high probability.

39 Claims, 6 Drawing Sheets

OTHER PUBLICATIONS

Nabaa, Nassib et al., "Derivation and Analytic Evaluation of an Equivalence Relation Clustering Algorithm", IEEE Transactions on Systems, MAn, And Cybernetics—Part B: Cybernetics, vol. 29, Issue 6, Dec. 1999, pp. 908–912.*

Roussopoulos, Nick et al., "Nearest Neighbor Queries", Proceedings of the 1995 ACM SIGMOD international conference on Management of Data, May 22–25, 1995, pp. 71–79.*

Shimoji, Shunichi et al., "Data Clustering with Entropical Scheduling", IEEE International Conference on Neural Networks; IEEE World congress on Computational Intelligence, Jun. 27–Jul. 2 1994, vol.: 4, pp. 2423–2428.*

S. Berchtold et al., "A Cost Model For Nearest Neighbor Search in High–Dimensional Data Space". In proceedings 14th International Conference on Data Engineering. (1998).

S. Berchtold et al., "Fast Nearest Neighbor Search in High–Dimensional Space". In ACM PODS Symposium on Principles of Database Systems, Tucson, Arizona, (1997).

S. Berchtold et al, The Pyramid–Technique:"Towards Breaking The Curse of Dimensionality", pp. 142–153, Seattle, WA. In Proceedings of ACM SIGMOD International Conference On Management of Data, (1998).

S. Berchtold et al., High–Dimensional Index Structures: "Database Support For Next Decade's Application". Tutorial notes: ACM SIGMOD–98 Conference on Management Conference On Management of Data, Seattle, WA. pp. 1–65, (1998).

S. Berchtold et al., The X–Tree: "An Index Structure For High–Dimensional Data .In Proceedings of the 22nd Conference on Very Large Databases", pp. 28–39 Bombay, India, (1996).

K. Beyer et al., "When Is nearest Neighbor Meaningful"? In Proceedings of the 7th International Conference On Database Theory (ICDT) pp. 1–19, Jerusalem, Israel, (1999) (1998).

C. Faloutsos et al., The TV–Tree: "An Index Structure For High–Dimensional Data". VLDB Journal 3(4): pp.181–210, (1994).

C. Faloutsos et al., Fastmap: "A Fast Algorithm For Indexing, Data–Mining and Visualization of Traditional and Multimedia Datasets". In Proceedings of ACM SIGMOD International Conference On Management of Data, San Jose, pp. 1–25, (1995).

R. Farebrother. Algorithm as 204: "The Distribution of a Positive Linear Combination of Chi–Square Random Variables". Applied Statistics, 32(3):332–337, (1983).

N. Katayama et al., The SR–Tree: "An Index Structure For High–Dimensional Nearest Neighbor Queries". In Proceedings of ACM SIGMOD International Conference On Management of Data, pp. 1–12, Tucson, Arizona, (1997).

T. Seidl et al., "Optimal Multi–Step K–Nearest Neighbor Search". In Proceedings of ACM SIGMOD International Conference on Management of Data, pp. 154–165 (1998).

Shim et al., The $\in$–K–D–B Tree: "A Fast Index Structure For High–Dimensional Similarity Joins". In the 13th International Conference On Data Engineering. (unknown).

White et al., "Similarity Indexing With The SS–Tree". In Proceedings of the 12th International Conference on Data Engineering, New Orleans, pp. 516–523, (1996).

Indyk et al., Approximate Nearest Neighbors: "Towards Removing The Curse of Dimensionality", pp. 1–13 (1998).

C. Bishop, Neural Networks for Pattern Recognition: "Bayes' Theorem", Clarendon Press. Oxford pp. 17–23 (1995).

C. Bishop, Neural Networks For Pattern Recognition: "The Normal Distribution", Clarendon Press. Oxford, pp. 34–38 (1995).

C. Bishop, Neural Networks For Pattern Recognition: "Maximum Likihood" Clarendon Press. Oxford, pp. 39–42 (1995).

C. Bishop, Neural Networks For Pattern Recognition: "Density Estimation In General" Clarendon Press. Oxford pp. 51–55 (1995).

C. Bishop, Neural Networks For Pattern Recognition: "Mixture Models" Clarendon Press. Oxford pp. 59–72 (1995).

A.P. Dempster, N.M. Laird, and D.B. Rubin, "Maximum Likelihood From Incomplete Data Via The EM Algorithm". Journal of The Royal Statistical Society, Series B, 39(1): 1–38, (1977).

K. Fukunaga, Statistical Pattern Recognition: "Nearest Mean Reclassification Algorithm" (k–mean): Chapter 11 pp. 515–523, Academic Press (1990).

E. Forgy, "Cluster Analysis of Multivariate Date: Efficiency vs. Interpretability of Classifications", Biometrics 21:768. (1965).

T. Zhang et al., BIRCH: "A New Data Clustering Algorithm and its Applications, Data Mining and Knowledge Discovery" 1(2). (1997).

* cited by examiner

DENSITY-BASED INDEXING METHOD FOR EFFICIENT EXECUTION OF HIGH DIMENSIONAL NEAREST-NEIGHBOR QUERIES ON LARGE DATABASES

FIELD OF THE INVENTION

The present invention concerns a database management system (DBMS) for storing data and retrieving the data based on a data access language such as SQL. One major use of database technology is to help individuals and organizations make decisions and generate reports based on the data contained within the database. This invention is also applicable to the retrieval of data from non-traditional data sets, such as images, videos, audio, and mixed multimedia data in general.

BACKGROUND ART

An important class of problems in the areas of database decision support and analysis are similarity join problems, also known as nearest-neighbor queries. The basic problem is: given a record (possibly from the database), find the set of records that are "most similar" to it. The term record here is used in general to represent a set of values, however the data can be in any form including image files, or multimedia files, or binary fields in a traditional database management system. Applications are many and include; marketing, catalog navigation (e.g. look-up products in a catalog similar to another product), advertising (especially on-line), fraud detection, customer support, problem diagnosis (e.g. for product support), and management of knowledge bases. Other applications are in data cleaning applications, especially with the growth of the data warehousing market.

It has been asserted in the database literature that the only way to answer nearest neighbor queries for large databases with high dimensionality (many fields) is to scan the database, applying the distance measure between the query object and every record in the data. The primary reason for this assertion is that traditional database indexing schemes all fail when the data records have more than 10 or 20 fields (i.e. when the dimensionality of the data is high). Consider databases having hundreds of fields. This invention provides a method that will work with both low dimensional and high dimensional data. While scanning the database is acceptable for small databases, it is too inefficient to be practical or useful for very large databases. The alternative is to develop an index, and hope to index only a small part of the data (only a few columns but not all). Without variation, most (probably all) schemes published in the literature fail to generalize to high-dimensionality (methods break down at about 20 dimensions for the most advanced of these approaches, at 5 or 6 for traditional ones).

This problem is of importance to many applications (listed above) and generally is a useful tool for exploring a large database or answering "query-by-example" type queries (e.g., the graphic image closest to a given image). Hence it can be used as a means for extending the database and providing it with a more flexible interface that does not require exact queries (as today's SQL requires). It can also be used to index image data or other multi-media data such as video, audio, and so forth.

Most practical algorithms work by scanning a database and searching for the matches to a query. This approach is no longer practical when the database grows very large, or when the server is real-time and cannot afford a long wait (e.g. a web server). The solution is to create a multi-dimensional index. The index determines which entries in the database are most likely to be the "nearest" entries to the query. The job then is to search only the set of candidate matches after an index scan is conducted. Note that the query can be just a record from the database and the answer is determining other records similar to it. Another example is an image query where the answer is images "similar" to this query by some user defined distance metric.

As an example, consider a database that contains the ages, incomes, years of experience, number of children, etc. on a set of people. If it was known ahead of time that queries will be issued primarily on age, then age can be used as a clustered-index (i.e. sort the data by age and store it in the database in that order). When a query requesting the entry whose age value is nearest some value, say 36 years, then one only need visit the relevant parts of the database. However, indexing rapidly becomes difficult to perform if one adds more dimensions to be indexed simultaneously. In fact, as the number of indexes grows, the size of the index structure dominates the size of the database.

This problem has been addressed in prior work on index structures (including TV-trees, SS-Tree, SR-Trees, X-Trees, KD-trees, KD-epsilon-Trees, R-trees, R+-trees, R*-trees, VA-File) and methods for traversal of these structures for nearest neighbor queries. Any indexing method has to answer three questions: 1. how is the index constructed? 2. how is the index used to select data to scan? and 3. how is the index used to confirm that the correct nearest neighbor has been found?

Prior art approaches had serious trouble scaling up to higher dimensions. Almost always a linear scan of the database becomes preferable between 20 and 30 dimensions. For traditional indexing scheme this happens at 5 dimensions or even lower. Statistical analysis of k-d tree and R-tree type indexes confirms this difficulty; see Berchtol S., Böhm C., Keim, D., Kriegel, H.-P.: "Optimized Processing of Nearest Neighbor Queries in High-Dimensional Space", submitted for publication, 1998 and Berchtold S., Böhm C., Keim D. and Kriegel H. P.: "A Cost Model for Nearest Neighbor Search in High Dimensional Space", ACM PODS Symposium on Principles of Database Systems, Tucson, Ariz., 1997. Indexes work by partitioning data into data pages that are usually represented as hyperectangles or spheres. Every data page that intersects the query ball (area that must be searched to find and confirm the nearest neighbor point) must be scanned. In high-dimensions for hyperrectangles and spheres, the query ball tends to intersect all the data pages. This is known as the "curse of dimensionality". In fact, in a recent paper, by Beyer K., Goldstein J., Ramakrishnan R., Shaft U, "When is Nearest Neighbor Meaningful?" submitted for Publication, 1998, the question is raised of whether it makes sense at all to think about nearest neighbor in high-dimensional spaces.

Most analyses in the past have assumed that the data is distributed uniformly. The theory in this case does support the view that the problem has no good solution. However, most real-world databases exhibit some structure and regularity. In fact, a field whose values are uniformly distributed is usually rare, and typically non-informative. Hence it is unlikely that one would ask for nearest neighbor along values of a uniformly distributed field. In this invention the statistical structure in the database is exploited in order to optimize data access.

SUMMARY OF THE INVENTION

The present invention exploits structure in data to help in evaluating nearest neighbor queries. Data records stored on a storage medium have multiple data attributes that are described or summarized by a probability function. A nearest neighbor query is performed by assigning an index for each of the records based upon the probability function and then efficiently performing the nearest neighbor query.

In a typical use of the invention, the data is stored with the help of a database management system and the probability function is determined by performing a clustering of the data in the database. The results of the clustering are then used to create a clustered-index structure for answering nearest neighbor queries on the data stored in the database. The clustering identifies groups in the data consisting of elements that are generally "more similar" to each other than elements in other groups. The clustering builds a statistical model of the data. This model is used to determine how the data should be partitioned into pages and also determines the order in which the data clusters or pages should be scanned. The model also determines when scanning can stop because the nearest neighbor has been found with very high-probability.

Preliminary results on data consisting of mixtures of Gaussian distributions shows that if one knows what the model is, then one can indeed scale to large dimensions and use the clusters effectively as an index. Tests have been conducted with dimensions of 500 and higher. This assumes that the data meets certain "stability" conditions that insure that the clusters are not overlapping in space. These conditions are important because they enable a database design utility to decide whether the indexing method of this invention is likely to be useful for a given database. It is also useful at run-time by providing the query optimizer component of the database system with information it needs to decide the tradeoff between executing an index scan or simply doing a fast sequential scan.

An exemplary embodiment of the invention evaluates data records contained within a database wherein each record has multiple data attributes. A new database of records is then built having an augmented record format that contains the original record attributes and an additional record attribute containing a cluster number for each record based on the clustering model. Each of the records that are assigned to a given cluster can then be easily accessed by building an index on the augmented data record. The process of clustering and then building an index on the record of the augmented data set allows for efficient nearest neighbor searching of the database.

This and other objects, advantages and features of the invention will become better understood from the detailed description of an exemplary embodiment of the present invention which is described in conjunction with the accompanying drawings.

DETAILED DESCRIPTION OF EXEMPLARY EMBODIMENT OF THE INVENTION

Figure 1:
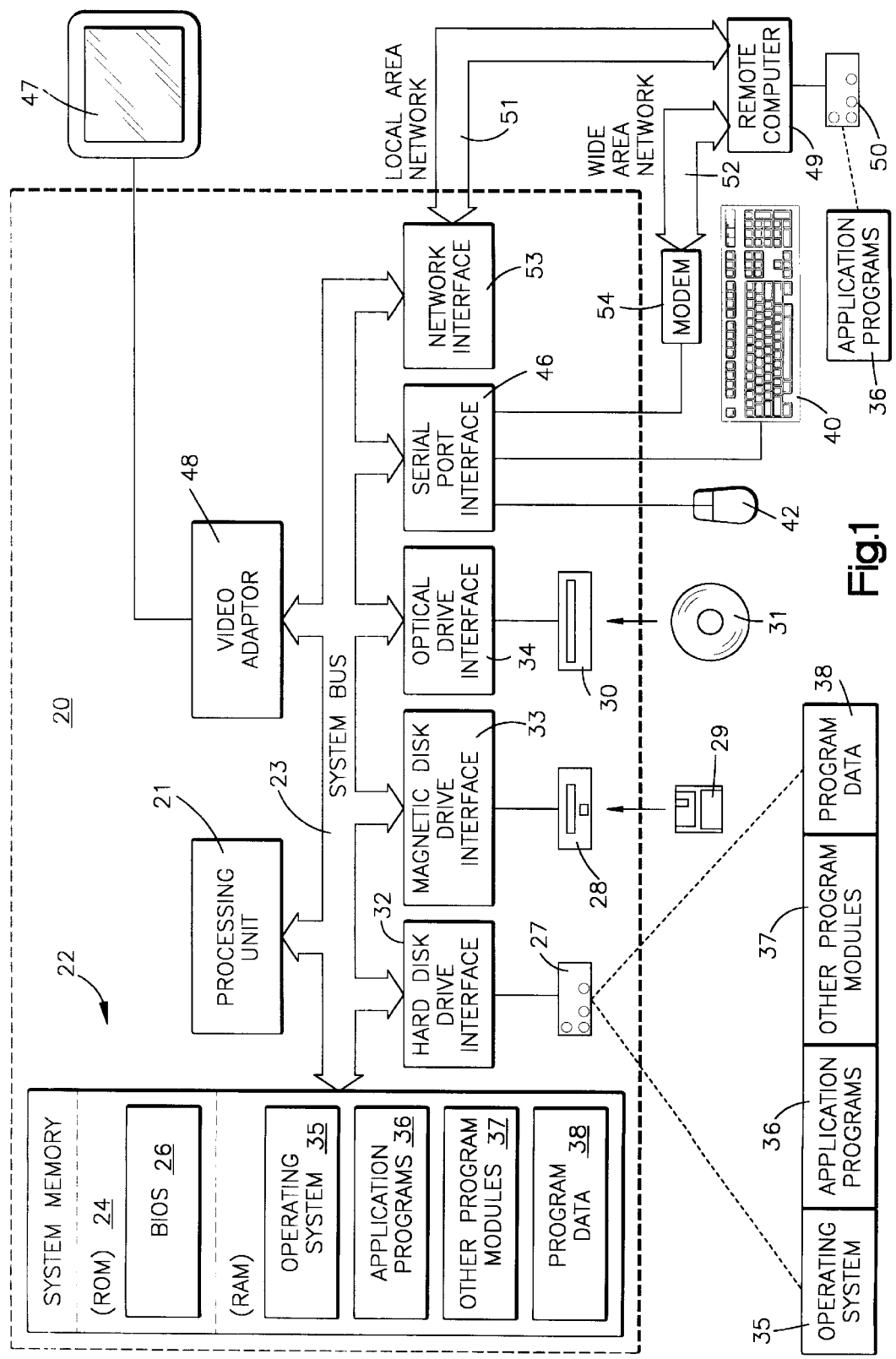
FIG. 1 is a schematic depiction of a computer system for use in practicing the present invention.
Figure 2A:
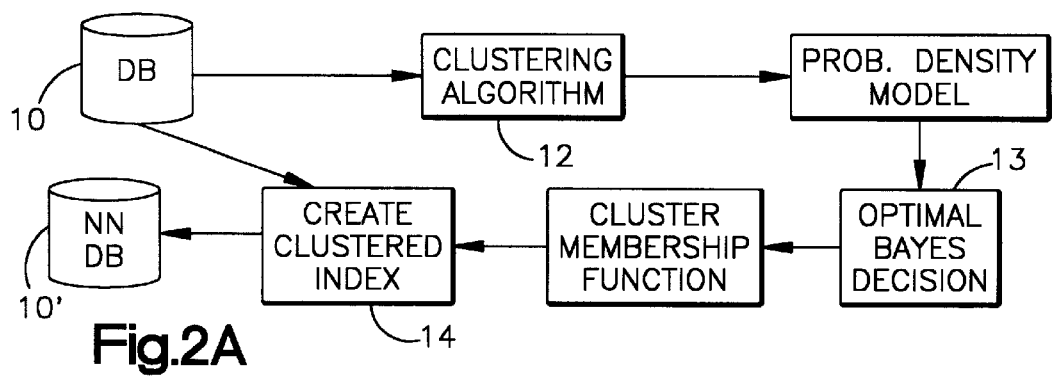
FIG. 2A is a schematic depiction of a data mining system constructed in accordance with an exemplary embodiment of the present invention.

The present invention has particular utility for use in answering queries based on probabilistic analysis of data contained in a database 10 (FIG. 2A). Practice of the invention identifies data partitions most likely to contain relevant data and eliminates regions unlikely to contain relevant data points. The database 10 will typically have many records stored on multiple, possibly distributed storage devices. Each record in the database 10 has many attributes or fields. A representative database might include age, income, number of years of employment, vested pension benefits etc. A data mining engine implemented in software running on a computer 20 (FIG. 1) accesses data stored on the database and answers queries.

Figure 2B:
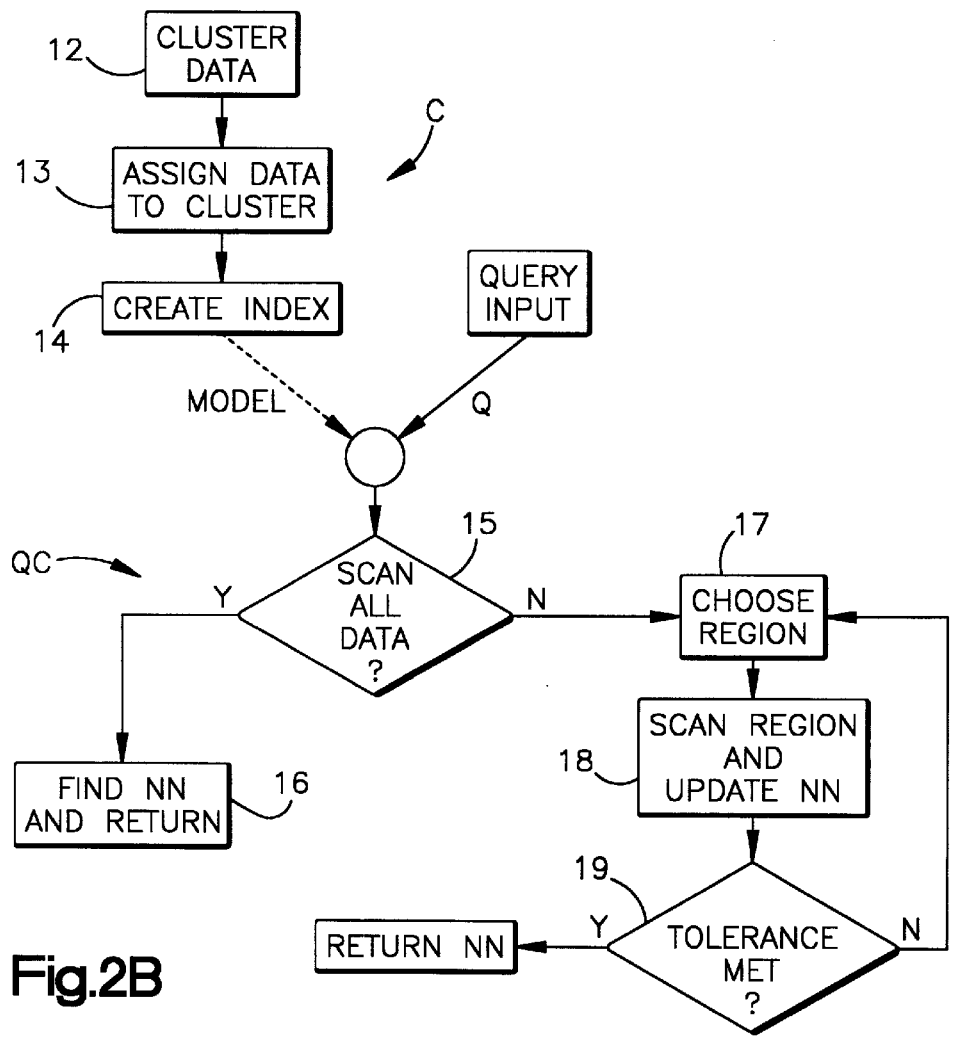
FIG. 2B is a flow chart documenting the processing steps of an exemplary embodiment of the invention.

An indexing process depicted in FIG. 2B includes the step of producing 12 a cluster model. Most preferably this model provides a best-fit mixture-of-Gaussians used in creating a probability density function for the data. Once the cluster model has been created, an optimal Bayes decision step 13 is used to assign each data point from the database 10 into a cluster. Finally the data is sorted by their cluster assignment and used to index 14 the database or optionally created an augmented database 10' (FIG. 2A) having an additional attribute for storing the cluster number to which the data point is assigned. As an optional step in the indexing process one can ask whether it makes sense to index based upon cluster number. If the data in the database produces unstable clusters as that term is defined below, then a nearest neighbor query using probability information may make little sense and the indexing on cluster number will not be conducted.

One use of the clustering model derived from the database 10 to answer nearest neighbor queries concerning the data records in the database. FIG. 2B depicts a query analysis component QC of the invention. Although both the clustering component C and the query component QC are depicted in FIG. 2B, it is appreciated that the clustering can be performed independently of the query. The query analysis component QC finds with high probability a nearest neighbor (NN) of a query point Q presented as an input to the query analysis component. The nearest neighbor of Q is then found in one of two ways. A decision step 15 determines whether a complete scan of the database is more efficient than a probabalistic search for the nearest neighbor (NN). If the complete scan is more efficient, the scan is performed 16 and the nearest neighbor identified. If not, a region is chosen 17 based on the query point and that region is scanned 18 to determine the nearest neighbor within the region. Once the nearest neighbor (NN) in the first identified region is found, a test is conducted 19 to determine if the nearest neighbor has been determined with a prescribed tolerance or degree of certainty. If the prescribed tolerance is not achieved a branch is take to identify additional regions to check for a nearest neighbor or neighbors. Eventually the nearest neighbor or neighbors are found with acceptable certainty and the results are output from the query analysis component QC.

Figure 3A:
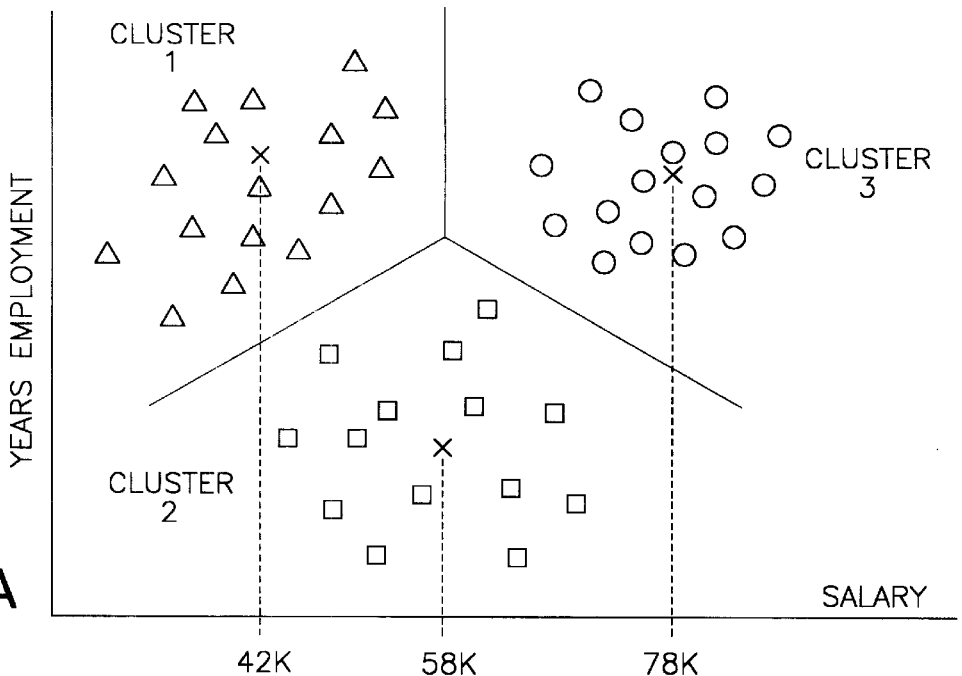
FIGS. 3A and 3B schematically illustrate data clusters.
Figure 3B:
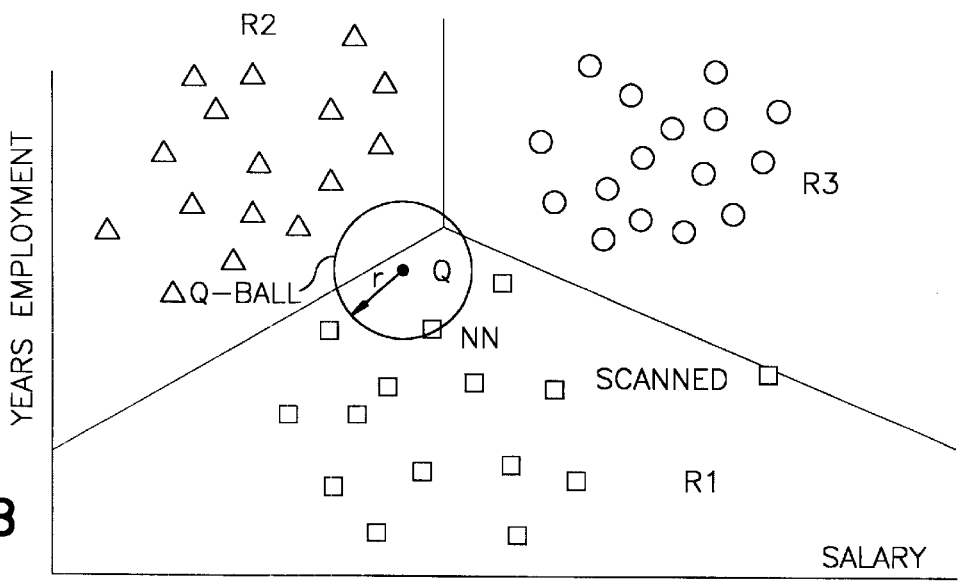

To illustrate the process of finding a nearest neighbor outlined in FIG. 2B consider the data depicted in FIGS. 3A and 3B. FIG. 3A is a two dimensional depiction showing a small sampling of data points extracted from the database 10. Such a depiction could be derived from a database having records of the format shown in Table 1:

TABLE 1

| EmployeeID | Age | Salary | Years Employed | Vested Pension | Other Attributes |
|---|---|---|---|---|---|
| XXX-XX-XXXX | 46 | 39K | 15 | 100K | — |
| YYY-YY-YYYY | 40 | 59K | 4 | 0K | — |
| QQQ-QQ-QQQQ | 57 | 88K | 23 | 550K | — |

The two dimensions that are plotted in FIG. 3A are years of employment and salary in thousands of dollars. One can visually determine that the data in FIG. 3A is lumped or clustered together into three clusters Cluster1, Cluster2, and Cluster3. FIG. 3B illustrates the same data points depicted in FIG. 3A and also illustrates an added data point or data record designated Q. A standard question one might ask of the data mining system 11 would be what is the nearest neighbor (NN) to Q in the database 10? To answer this question in an efficient manner that does not require a complete scan of the entire database 10, the invention utilizes knowledge obtained from a clustering of the data in the database.

Database Clustering

One process for performing the clustering step 12 of the data stored in the database 10 suitable for use by the clustering component uses a K-means clustering technique that is described in co-pending United States patent application entitled "A scalable method for K-means clustering of large Databases" that was filed in the United States Patent and Trademark Office on Mar. 17, 1998 under application Ser. No. 09/042,540 now, U.S. Pat. No. 6,012,058, and which is assigned to the assignee of the present application and is also incorporated herein by reference.

A second clustering process suitable for use by the clustering component 12 uses a so-called Expectation-Maximization (EM) analysis procedure. E-M clustering is described in an article entitled "Maximum likelihood from incomplete data via the EM algorithm", Journal of the Royal Statistical Society B, vol 39, pp. 1–38 (1977). The EM process estimates the parameters of a model iteratively, starting from an initial estimate. Each iteration consists of an Expectation step, which finds a distribution for unobserved data (the cluster labels), given the known values for the observed data. Co-pending patent application entitled "A Scalable System for Expectation Maximization Clustering of Large Databases" filed May 22, 1998 under application Ser. No. 09/083,906 describes an E-M clustering procedure. This application is assigned to the assignee of the present invention and the disclosure of this patent application is incorporated herein by reference.

In an expectation maximization (EM) clustering analysis, rather than harshly assigning each data point in FIG. 3A to a cluster and then calculating the mean or average of that cluster, each data point has a probability or weighting factor that describes its degree of membership in each of the K clusters that characterize the data. For the EM analysis used in conjunction with an exemplary embodiment of the present invention, one associates a Gaussian distribution of data about the centroid of each of the K clusters in FIG. 3A. EM is preferred over K-Means since EM produces a more valid statistical model of the data. However, Clustering can be done using any other clustering method, and then the cluster centers can be parametrized by fitting a gaussian on each center and estimating a covariance matrix from the data. EM gives us a fully parameterized model, and hence is the presently the preferred procedure.

Figure 5:
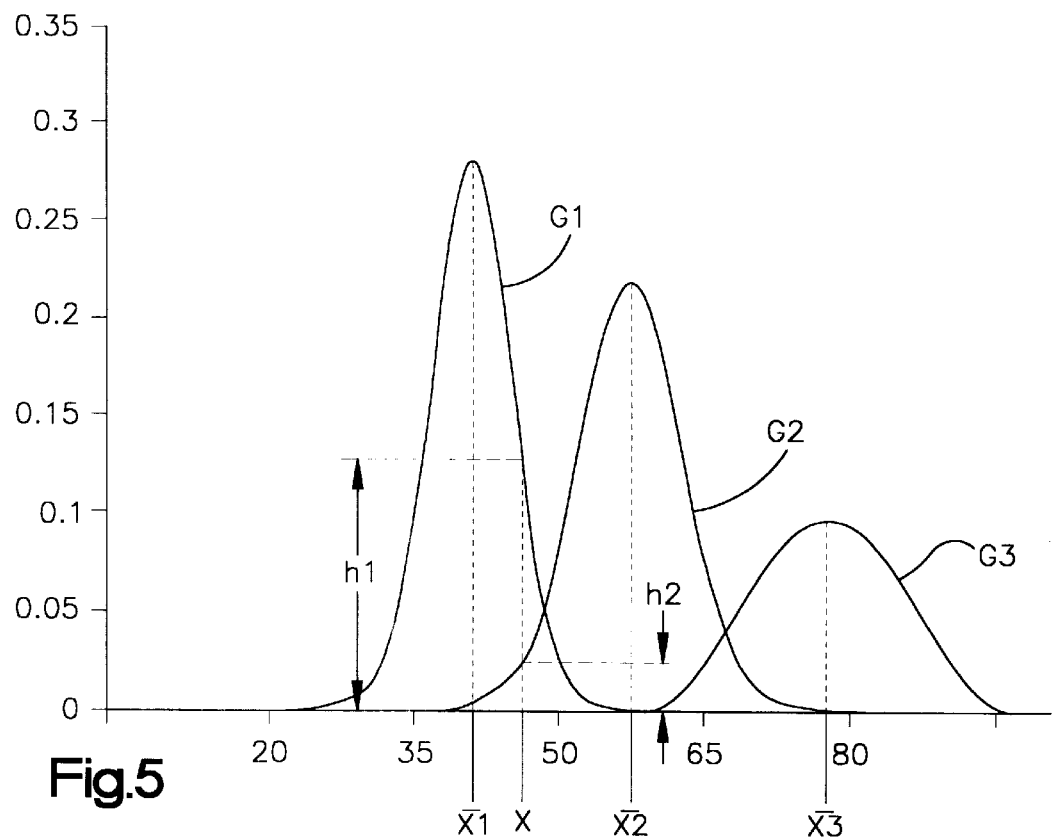
FIG. 5 is a depiction in one dimension of three Gaussians corresponding to the three data clusters depicted in FIGS. 3A and 3B.

Consider the one dimensional depiction shown in FIG. 5. The three Gaussians G1, G2, G3 represent three clusters that have centroids or means X1, X2, X3 in the salary attribute of 42K, 58K, and 78K dollars per year. The compactness of the data within a cluster is generally indicated by the shape of the Gaussian and the average value of the cluster is given by the mean. Now consider the data point identified on the salary axis as the point "X" of a data record having a salary of $45,000. The data point 'belongs' to all three clusters identified by the Gaussians. This data point 'belongs' to the Gaussian G2 with a weighting factor proportional to h2 (probability density value) that is given by the vertical distance from the horizontal axis to the curve G2. This same data point X 'belongs' to the cluster characterized by the Gaussian G1 with a weighting factor proportional to h1 given by the vertical distance from the horizontal axis to the Gaussian G1. The point 'X' belongs to the third cluster characterized by the Gaussian G3 with a negligible weighting factor. One can say that the data point X belongs fractionally to the two clusters G1, G2. The weighting factor of its membership to G1 is given by h1/(h1+h2+Hrest); similarly it belongs to G2 with weight h2/(h1+h2+Hrest). Hrest is the sum of the heights of the curves for all other clusters (Gaussians). Since the height in other clusters is negligible one can think of a "fraction" of the case belonging to cluster 1 (represented by G1) while the rest belongs to cluster 2 (represented by G2). For example, if h1=0.13 and h2=0.03, then 0.13/(0.13+0.03)=0.8 of the case belongs to cluster 1, while 0.2 of it belongs to cluster 2.

The invention disclosed in the above referenced two co-pending patent applications to Fayyad et al brings data from the database 10 into a computer memory 22 (FIG. 1) and the clustering component 12 creates an output model 14 from that data. The clustering model 14 provided by the clustering component 12 will typically fit in the memory of a personal computer.

Figure 4A:
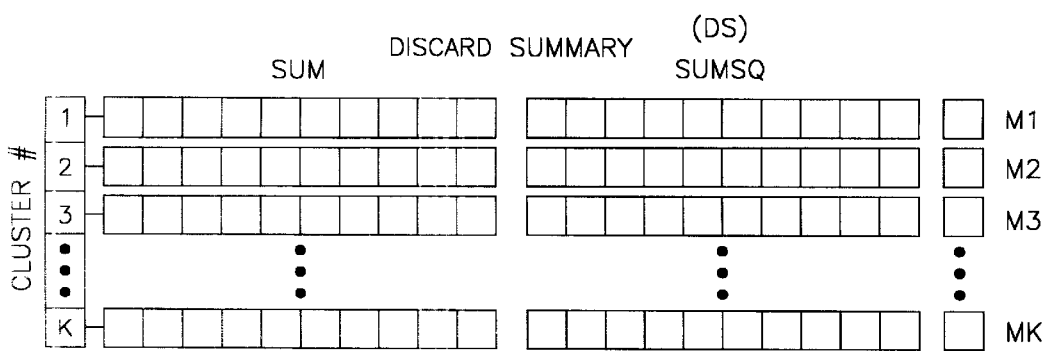
FIGS. 4A–4D depict data structures used during representative clustering processes suitable for use in practicing the present invention.
Figure 4B:
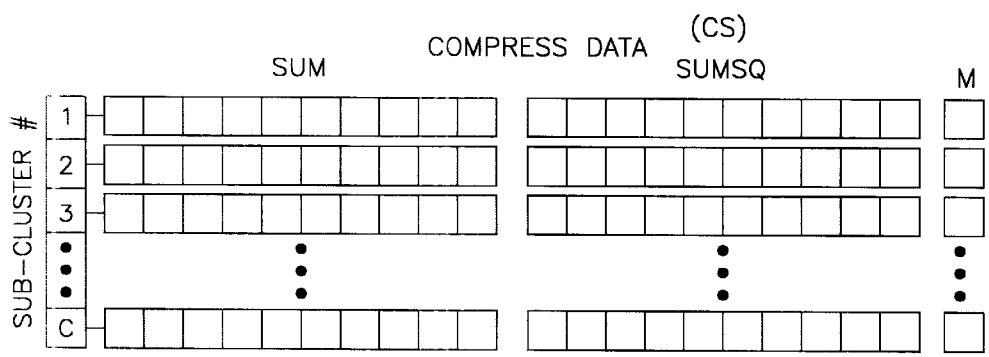
Figure 4C:
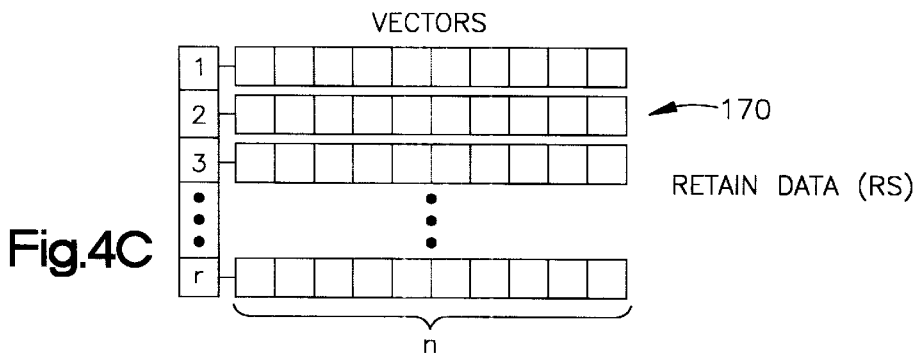

FIGS. 4A–4D illustrate data structures used by the K-means and EM clustering procedures disclosed in the aforementioned patent applications to Fayyad et al. The data structures of FIGS. 4A–4C are used by the clustering component 12 to build the clustering model 14 stored in a data structure of FIG. 4D. Briefly, the component 12 gathers data from the database 10 and brings it into a memory region that stores vectors of the data in the structure 170 of FIG. 4C. As the data is evaluated it is either summarized in the data structure 160 of FIG. 4A or used to generate sub-clusters that are stored in the data structure 165 of FIG. 4B. Once a stopping criteria that is used to judge the sufficiency of the clustering has been achieved, the resultant model is stored in a data structure such as the model data structure of FIG. 4D.

Probability Function

Each of K clusters in the model (FIG. 4D) is represented or summarized as a multivariate gaussian having a probability density function:

Equation 1:

$$p(x) = \frac{1}{(2\pi)^{n/2}\sqrt{|\Sigma|}} e^{(-1/2(x-\mu)^T \Sigma^{-1}(x-\mu))}$$

where $x=(x_1,x_2,x_3,x_4, \ldots, x_n)$ is a n-component column matrix corresponding to a data point in the selected n dimensional space of the database, $\mu$ is the n-component column matrix corresponding to a data structure 154 having the means (averages) of the data belonging to the cluster in each of the n dimensions (designated SUM in FIG. 4D) and sigma ($\Sigma$) is an n-by-n covariance matrix that relates how the values of attributes in one dimension are related to the values of attributes in other dimensions for the points belonging to the cluster. The transpose of a matrix $\Sigma$ is represented by $\Sigma^T$, and the inverse of a matrix $\Sigma$ is represented by $\Sigma^{-1}$. The determinant of a matrix $\Sigma$ is represented by $|\Sigma|$. The covariance matrix is always symmetric. The depiction of FIG. 6 represents this Gaussian for the two clusters G1, G2 in one dimension.

The number of values required to represent each cluster is the sum of the following quantities: the number N (one number) indicating the data records summarized in a given cluster. (In K-means clustering this is an integer in E-M clustering a floating point number) The dimension n equals the number of attributes in the data records and is equal to the width of a SUM data structure (FIG. 4D) of the model 14. There are n*(n+1)/2 values for the covariance matrix $\Sigma$ which give a total of 1+n+[n*(n+1)]/2 values in all. If the covariance matrix is diagonal (FIG. 4D for example), then there are n numbers in the covariance matrix 156 and the number of values needed to characterize the cluster is reduced to 1+2n. It is also possible to represent a full covariance matrix (not necessarily diagonal) if space allows.

Returning to the example of FIGS. 3A and 3B, one would in principle need to scan all data points to find the nearest neighbor point (NN) closest to query point Q. Instead of scanning the entire database, use of the clustering model, however, allows the nearest neighbor query process to scan only cluster #2. This avoids scanning 66% of data in the database assuming each cluster has 33% of data in it. In a situation wherein the cluster number K is larger the process is even more efficient.

Scanning of a cluster for the nearest neighbor implies a knowledge of cluster assignment for all points in the database 10. The properties summarized in FIGS. 7 and 8 allow a probability density based indexing method. The data is modeled as a mixture of Gaussians. A clustering algorithm such as scalable K-means or EM is used to cluster the data. The clustering allows a probability density function for the database to be calculated.

The model for each cluster is a Gaussian. Recall that each cluster l has associated with it a probability function of the form:

Equation 2:

$$p(x|l) = \frac{1}{(2\pi)^{n/2}|\Sigma^l|^{1/2}} \exp\left\{-\frac{1}{2}(x-\mu^l)^T (\Sigma^l)^{-1}(x-\mu^l)\right\}$$

where $\mu^l$ is the mean of the cluster, and $\Sigma^l$ designates the covariance matrix. It is assumed the data is generated by a weighed mixture of these Gaussians. A distance measure is assumed to be of the following form:

Equation 3:

$$Dist(x, y) = \sqrt{\sum_{i=1}^{n}(x_i - y_i)^2}$$

where x and y are data vectors. The invention supports a fairly wide family of distance measures. The assumption is made that the distance is of quadratiac normal form, i.e. it can be written as: $Dist(x,q)=(x-q)^T D(x-q)$ with D being a positive semi-definite matrix, i.e. for any vector x, $x^T Dx \geq 0$. For Euclidean distance, D is diagonal with all entries being 1.

Use of a Euclidean weighted distance measure does not change the results other than a pre-scaling of the input space:

Equation 4:

$$Dist(x, y) = \sqrt{\sum_{i=1}^{n} W_i(x_i - y_i)^2}$$

The use of a weighting factor allows certain dimensions of the n attributes to be favored or emphasized in the nearest neighbor determination. When the distance from a data point to a cluster with center $\mu^l$, the Euclidean distance is used:

Equation 5:

$$Dist(x, \mu) = \sqrt{\sum_{i=1}^{n}(x_i - \mu_i^l)^2}$$

The cluster membership function is given by:

Equation 6:

$$L = arg \max\ p(x|l)p(l)$$

Equation 6 assigns a data point x to the cluster with highest probability. This step 16 is known in the literature as an optimal Bayes decision Rule. (FIG. 2) The data points are partitioned into regions corresponding to predicted cluster membership.

The clustering step is followed by a step of creating a new column in the database that represents the predicted cluster membership. In accordance with the exemplary embodiment of the present invention, the database 10 is rebuilt using the newly added column, and the cluster number for the basis of a CLUSTERED INDEX as that term is used in the database field. Table 4 (below) illustrates the records of table 1 with an augmented field or attribute of the assigned cluster number.

TABLE 4

| EmployeeID | Age | Salary | Years Employed | Vested Pension | Cluster Number |
|---|---|---|---|---|---|
| XXX-XX-XXXX | 46 | 39K | 15 | 100K | #1... |
| YYY-YY-YYYY | 40 | 59K | 4 | 0K | #2 |
| QQQ-QQ-QQQQ | 57 | 88K | 23 | 550K | #3 |

A new database 10' (FIG. 2) is created that includes a clustered index based upon the augmented attribute of cluster number that is assigned to each data point in the database.

At query time, the invention scans the region or cluster most likely to contain the nearest-neighbor. The scanning is repeated until the estimated probability that the nearest-neighbor is correct exceeds some user defined threshold. Typically only a very small number of clusters or regions will need to be visited. The approach is applicable to K-nearest neighbor queries as well since relatively little additional overhead is needed to find the closest K data points within the cluster to which the data point Q is assigned. This invention also supports a file-based implementation and does not require a database system. In this case, instead of writing a new column, the data from each cluster is written into a separate file. The subsequent discussion refers to the extra column attribute, but simply replacing the step "scan cluster X" with "read data from file X" is an equivalent implementation of this invention.

Figure 4D:
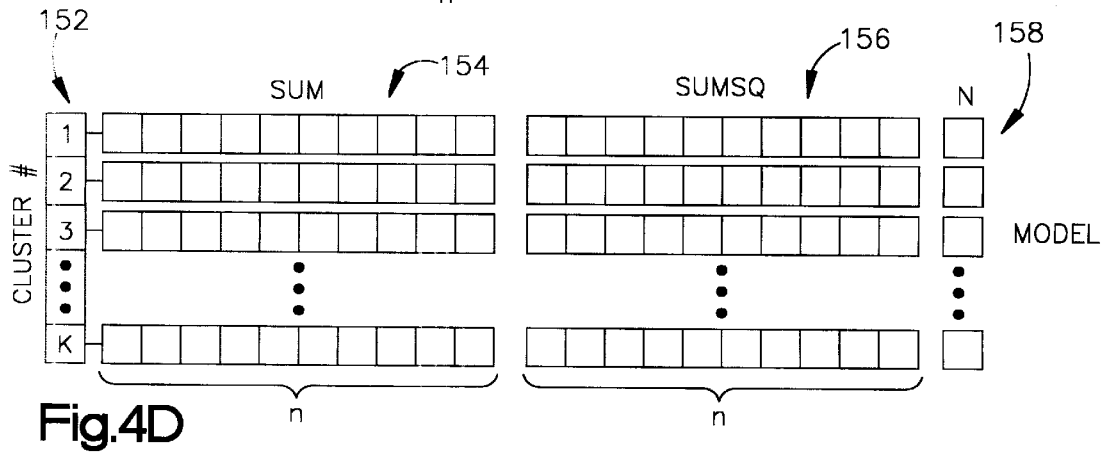

When a query is to be processed, it is assumed the input query of the point Q is a data record. The probability density model that is based upon the cluster model 14 of FIG. 4D is used to determine cluster membership for the data point Q. The process then scans the cluster most likely to contain the nearest neighbor (NN) based on a probability estimate. If the probability that the nearest neighbor estimate has been found is above a certain threshold, the process returns the nearest neighbor based upon the scan of the cluster, if not, a next most likely cluster is scanned. The distance to the nearest neighbor found so far in the scan is tracked. This distance defines a region around the query point Q which is designated the Q-ball in FIG. 3B. The choice of distance metric determines the shape of the ball. The next cluster with which we have the highest probability of encountering a nearest neighbor is next scanned. This probability is computed using a linear combination of non-central chi squares distribution which approximates the probability of a point belonging to the cluster falling within the Q-ball (say cluster 1 in FIG. 3B). If the probability is smaller than some threshold $\epsilon$, for example, the scan is terminated since this indicates the likelihood of finding nearer points is vanishinglysmall.

Exemplary Process and its Probablistic Analysis

This section describes in greater detail the process introduced above for answering nearest-neighbor queries in sufficient detail to permit analysis. The process includes two main components. The first component takes a data set D as input and constructs an index that supports nearest-neighbor queries. The second component takes a query point q and produces the nearest neighbor of that point with high probability.

The index is constructed in three steps.

1. Produce a best-fit mixture-of-Gaussians probability density function (pdf) for the data;
2 Use the optimal Bayes decision rule to assign each data point to a cluster; and
3. Sort the data points by their cluster assignment.

There are many ways to find a mixture-of-Gaussians pdf that fits data (e.g., Thiesson et al., 1998,). The exemplary process uses a scalable EM clustering scheme (See Fayyad et al pending patent application) that was developed to classify large databases for a variety of applications other than nearest-neighbor queries.

The outcome of this algorithm is a mixture-of-Gaussians pdf of the form:

Equation 7:

$$f(x) = \sum_{i=1}^{K} p_i G(x | \mu_i, \Sigma_i)$$

where $p_i$ are the mixture coefficients, $0<p_i<1, \Sigma p_i=1$, and $G(x|\mu_i,\Sigma_i)$ is a multivariate Gaussian pdf with a mean vector $\mu_i$ and a positive definite covariance matrix $\Sigma_i$. The optimal decision rule for a mixture of Gaussians pdf is presented in Duda and Hart, Pattern Classification and Scene Analysis, John Wiley and Sons, New York, 1973. It dictates that a data point x is assigned to Cluster $C_1$ if i=1 maximizes the quantity:

$$g_i = -\frac{1}{2}(x-\mu_i)^T \Sigma^{-1}(x-\mu_i) - \frac{1}{2} \log |\Sigma_i| + \log p_i.$$  Equation 8:

Note that this decision rule maximizes the probability that x is generated by the with Gaussian distribution in Equation 1(cluster $C_i$) and in that sense it is an optimal decision. This decision rule defines a set of K regions $R_1, \ldots, R_k$ in high-dimensional Euclidean space where $R_i$ contains the set of points assigned to the cluster Ci. Define R(x) to be the region-identification function; that is, each data point x belongs to region R(x) where R(x) is one of the K regions $R_1, \ldots, R_k$. Finally, an index I(x) is defined such that I(x)=i if R(x)=$R_i$, namely, I has K possible values which indicate to which cluster the optimal Bayes rule assigns x. The sorting of the database by I(x) can be implemented by adding a new attribute to the database and by building clustered indexes based on the cluster number.

The second component of the invention is activated at query time. It finds with high probability a nearest neighbor of a query point q, denoted by n(q). For its description, use the notation B(q,r) to denote a sphere centered on q and having radius r. Also denote by E the set of regions scanned so far, and by e the knowledge learned by scanning the regions in E. A nearest neighbor of q is then found as follows:

NearestNeighbor (q; $R_1, \ldots, R_k$,f)

1. Let Cj be the cluster assigned to q using the optimal decision rule (Equation2);
2. Scan data in $R_j$ and determine the nearest neighbor n(q) in Rj and its distance r from q;
3. Set E ={$R_j$};
4. While P(B(q,r) is Empty|e)>tolerance {
   a. find a cluster Cj not in E which minimizes P(B(q,r) ∩Rj is Empty|e);
   b. scan the data in Rj; Set E=EU{Rj};
   c. if a data point closer to q is found in Rj, let n(q) be that point, and set r to be the new minimum distance.
}

The quantity P(B(q,r) is Empty|e) is the probability that B(q,r), which is called the query ball, is empty, given the evidence e collected so far. The evidence consists simply of the list of points included in the regions scanned so far. Before we show how to compute this quantity and how to compute Pr(B(q,r)∩Ri isEmpty|e);, the process is explained using the simple example depicted in FIGS. 3A and 3B. In this example, the optimal Bayes rule generated three regions R1, R2, and R3 whose boundaries are shown. A given query point Q is found to reside in region R1. The algorithm scans R1, a current nearest neighbor (NN) is found, a current minimum distance r is determined, and a query ball B(q,r) is formed. The query ball is shown in FIG. 3B. If the process was deterministic it would be forced to scan the other regions, R2 and R3 since they intersect the query ball. Instead the process determines the probability that the ball is empty given the fact that the region R1 has been scanned. Suppose this probability exceeds the tolerance. The algorithm must now choose between scanning R2 and scanning R3. A choice should be made according to the region that maximizes the probability of finding a nearer neighbor once that region is scanned, namely, the algorithm should scan the region that minimizes P(B(q,r)∩Ri is Empty|e). This quantity is hard to compute and so the algorithm approximate this quantity using equation 9 below.

It is shown how to compute the approximation and analyze the difference between the computed quantity and the desired one. In this example, region R2 is selected to be scanned. The process then halts because P(B(q,r) is Empty|e) becomes negligible once R1 and R2 have been scanned. The basis for computing P(B(q,r) is Empty|e) is the fact that data points are assumed to be randomly generated using the mixture-of-Gaussians pdf f (equation 1). In other words, take f to be the true model that generated the database. The sensitivity of the process to this assumption must be tested using real data sets. The probablity the ball is empty is the product of the probabilities that each point does not fall in the ball, because, according to the assumption, the $x_i$'s are did samples from f(x). Consequently, one has:

Equation 9:

$$P(B(q,r) is Empty \mid e) = \prod_{i=1}^{n} [1 - P(x_i \in B(q,r) \mid x_i \in R(x_i))]$$

Where $R(x_i)$ is the region of $x_i$ and n is the number of data points. If $R(x_i)$ has been scanned then $P(x_i \in B(q,r) \mid x_i \in R(x_i))$ = 0. In general, $P(x_i \in B(q,r) \mid x_i \in R(x_i))$ is not computable. Fortunately, it is acceptable to use the approximation:

$P(x_i \in B(q,r) \mid x_i \in R(x_i))$ approx=$P(x_i \in B(q,r) \mid x_i$ generated by $C_j$)  Equation 10:

Where $C_j$ is the cluster assigned to $x_i$ using the optimal Bayes decision rule.

Using the same reasoning as above and the fact that $P(x_i \in B(q,r) \cap R_j \mid x_i \in R(x_i)) = P(x_i \in B(q,r) \mid x_i \in R_j))$, then one has:

$P(B(q,r) \cap Rj$ is Empty$\mid e)=[1-P(x_i \in B(q,r) \mid x_i \in R_j)]^{n(Rj)}$  Equation 11:

Which is approximately=$[1-P(x_i \in B(q,r) \mid x_i$ generated by $C_j)]^{n(Rj)}$, where $n(R_j)$ is the number of points falling in region $R_j$.

The remaining task of computing $P(x \in B(q,r) \mid x$ generated by $C_1$ has been dealt with in the statistical literature in a more general setting. This probability can be calculated numerically using a variety of approaches. In particular, numerical approaches have been devised to calculate probabilities of the form:

$P[(x-q)^T D(x-q) <= r^2]$  Equation 12:

X is a data point assumed to be generated by a multivariate Gaussian distribution $G(x|\mu,\sigma)$. D is a positive semi-definite matrix. In case Euclidean distance is used to measure distances between data points, D is simply the identity matrix. However, the numerical methods apply to any distance function of the form $d(x,q)=(x-q)^T D(x-q)$ where D is a positive semi-definite matrix.

The pdf of the random variable $(x-q)^T D(x-q)$ is a chi squared distribution when D=I and $q=\mu$. It is a noncentralized chi squared distribution when D=I and q is not equal to $\mu$. It is a sum of non-centralized chi-squared pdfs in the general case of a positive semi-definite quadratic form e.g. $x^T D x > 0$ for any x. The general method uses a linear transformation to reduce the problem to calculating the cumulative distribution of a linear combination of chi-squares. The invention uses a method of Sheil and O'Murcheataigh. (See *Quadratic Forms in Random Variables*. Marcel Dekker, Inc., New York, 1992) The computation is illustrated assuming that the dimensions are uncorrelated (i.e. $\Sigma$ is diagonal) and that the Euclidean distance metric is used (D is the identity matrix), but the needed probability is computable for the general case. In the general case:

Equation 13:

$$(x-q)^T D(x-q) = \sum_{j=1}^{n} (x_j - q_j)^2$$

Where $q_j$ is the jth component of q and $x_j$ is transformed to a standard normal random variable $z_j$ of the form:

Equation 14:

$$(x_j - q_j)^2 = \frac{\sigma_j^2((x_j - \mu_j) + (\mu_j - q_j))^2}{\sigma_j^2} = \sigma_j^2 (z_j - \delta_j)^2$$

Where $\delta_j = (\mu_j - q_j)/\sigma_j$ and $\mu_j$ is the jth component of $\mu$. Now $(Z-\delta_j)^2$ has a noncentral chi-square distribution with 1 degree of freedom and noncentrality parameter $\delta_j^2$.
The final result is:

Equation 15:

$$P[(x-q)^T D(x-q) \le r^2] = P\left[\sum_{j=1}^{n} \sigma_j^2 \chi^2(1, \delta_j^2) \le r^2\right]$$

This cumulative distribution function (cdf) can be expanded into an infinite series. The terms of the series are calculated until an acceptable bound on the truncation error is achieved.

Cluster Stability

Traditional (prior art) indexing methods for performing nearest neighbor searches conclude that scanning of the entire database must be used when the number of dimensions of the data increase. In Berchtold et al "A cost model for nearest neighbor search in high-dimensional data space", ACM PODS Symposium on Principles of Database Systems, Tucson Ariz., 1997, an approximate nearest neighbor model on assumed uniform distribution of data found that in high dimensions a fill scan of the database would be needed to find the nearest neighbor of a query point. A key assumption of the Berchtold et al work is that if a nearest-neighbor query ball intersects a data page the data page must be visited in the nearest neighbor search.

Figure 9A:
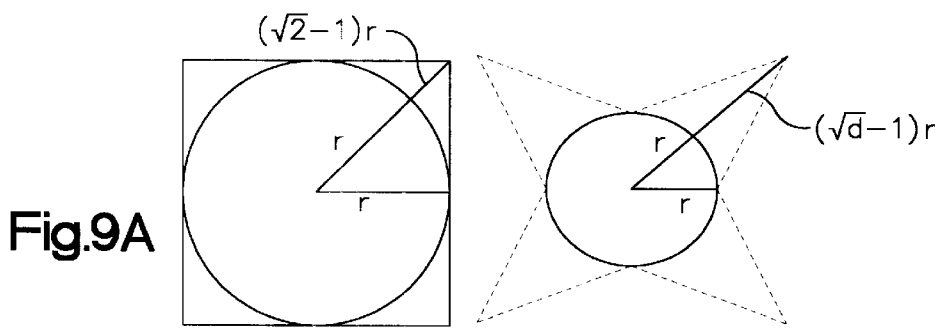
FIG. 9A is a two dimensional illustration of why high dimensional data records make nearest neighbor inquiries difficult.

Consider the example illustrated in FIG. 9A. This figure assumes a set of data points resides densely in an d-dimensional sphere of radius r and that to perform a nearest neighbor search a minimum bounding rectangle is constructed around this sphere. The two dimensional case is shown on the left of FIG. 9A. Note the ratio of the volume of the inscribed sphere to the volume of the minimum bounding box used to perform the nearest neighbor search converges rapidly to 0 as d goes to infinity. Define the 'corners' of the bounding box as the regions outside the sphere but still in the box. When d (dimensionality) is large, most of the volume is in the corner of the boxes and yet there is no data in these corners. FIG. 9A at the right suggests the growth of the corners. In fact both the number and size of the corners grow exponentially with dimensionality.

Any fixed geometry will never fit real data tightly. In high dimensions, such discrepancies between volume and density of data points start to dominate. In conclusion, indices based on bounding objects are not good enough, because they frequently scan data pages where no relevant data resides.

By introducing the concept of cluster stability the dimensionality problem is addressed and used to determine when scanning of the database is necessary. If the data in the entire database is generated from a single Gaussian, then scanning of the database is necessary. In a mixture of Gaussians, each data point or query is generated by a single Gaussian. The points that are being clustered can be thought of as being generated by the Gaussian that generated them. It is assumed that the data point and the query points are generated by the same distribution. If the distance between data points in the same cluster approaches the mean cluster separation distance as the dimensionality increases the clusters is said to be unstable since every point is the same distance apart. Similarly, the distance between any two points from two distinct cluster approaches the mean between cluster distance.

Figure 9B:
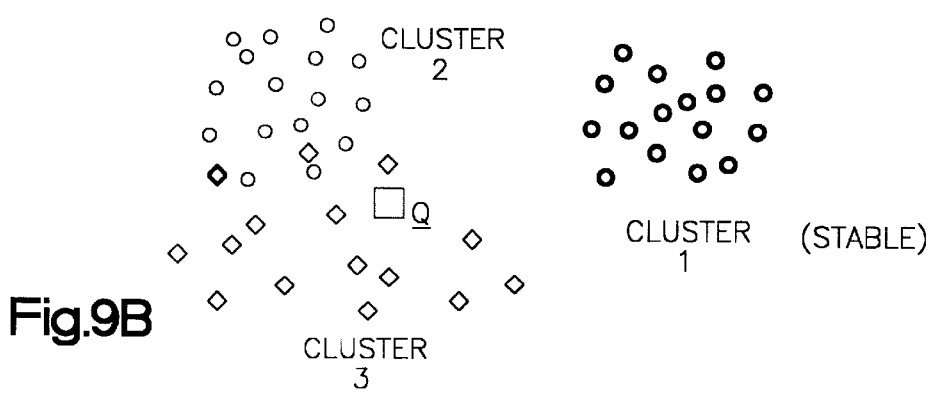
FIG. 9B is a depiction of three data clusters showing one stable cluster and two unstable clusters.

If for two clusters, the between cluster distance dominates the within cluster distance, the clusters are stable with respect to each other. In FIG. 9B the points in cluster 1 are stable and in clusters 2 and 3 there are unstable.

Assume $q_d$ and $x_{d,i}$ are generated by cluster i and $X_{d,j}$ is generated by cluster j. If $$\frac{\|x_{d,i} - q_d\|^2}{E(\|x_{d,i} - q_d\|^2)} \to 1 \text{ and } \frac{\|x_{d,i} - q_d\|^2}{E(\|x_{d,i} - q_d\|^2)} \to \delta > 1$$

Then the clusters i and j are pairwise stable with parameter $\delta$ and for any e>0.

$$lim_{d \to \infty} P(\|x_{d,j} - q_d\|^2 \geq (\delta - e)\|x_{d,i} - q_d\|^2) = 1$$

If every cluster is stable with respect to at least one other cluster then its nearest neighbor search will be well defined. With probability 1, the ratio of the farthest and nearest neighbors is bigger than some constant greater than 1. For example in FIG. 9A, Cluster 1 is stable with respect to both Clusters 2 and 3 so a nearest neighbor is well defined.

Assume a query point $q_d$ and a data point $X_{d,i}$ are generated by a cluster i and a data point $x_{d,j}$ is generated by cluster j. If cluster I is unstable with itself and there exists a cluster j that is pairwise stable with i with parameter $\delta>1$, then for any e>0:

$$lim_{d \to \infty} P[DMAX_d \geq (\delta - e)DMIN_d] = 1$$

If every cluster is stable with respect to every other cluster then if a point belongs to one cluster, its neareste neighbor also belongs to that cluster. Therefore if the data is partitioned by cluster membership then with probability one the index will only need to visit one cluster to find the nearest neighbor. With probability one (i.e. certainty) other clusters can be skipped and no false drops of points in the query occur.

Assume $q_d$ and $x_{d,i}$ are generated by cluster i. If cluster I is unstable with itself and pairwise $\delta ij > \delta > 1$ stable with every other cluster j, j not equal to I, then $q_d$ nearest neighbor was also generated by cluster i. Specifically for any point $X_{d,j}$ from cluster j not in i:

$$P[\|x_{d,j} - q_d\|^2 \geq (\delta - e)\mu x_{d,i} - q_d\|^2] = 1.$$

These results show that if one has a stable mixture of Gaussians where the between cluster distance dominates the within cluster distance, and if a cluster partition membership function is used to assign all data generated by the same Gaussian to the same partition, the index can be used for nearest neighbor queries generated by the same distribution. The higher the dimensionality, the better the nearest neighbor query works.

Number of Clusters

From the perspective of indexing, the more clusters one has, the less data one must scan. However, determining which cluster to scan next requires a lookup into the model. If there are too many clusters, this lookup becomes too expensive. Consider an extreme case where each point in the database is its own cluster. In this case no data will need to be scanned as the model identifies the result directly. However, the lookup into the model is now as expensive as scanning the entire database.

Generally, the number of clusters is chosen to be between 5 and 100. The cost of computing probabilities from the model in this case if fairly negligible. Note that with 5 clusters, assuming well-separated clusters, one can expect an 80% savings in scan cost. So not many clusters are needed. The tradeoff between model lookup time and data scan cost can be optimized on a per application basis.

Types of Queries Supported

The query data record in nearest-neighbor applications can be either from the same distribution the data came from or from a different distribution. In either case, the invention works well since the probabilities discussed above work for any fixed query points. If the query is from the data used to generate the probabilities, the invention will find the nearest neighbor in a scan of one cluster. This is true if the query comes from the same distribution that the cluster model is drawn from and the distribution is stable.

Assume one has a cluster model with a set of clusters C, and Let $|C_i|$, I=1, . . . ,K, denote the size of $C_i$ for $C_i \in C$. The $|C|$ is the summation of $|C_i|$ over all the $C_i$. If one defines $S_i$ to be the proportion of data that are member of $C_i$, i.e. $S_i = |C_i|/|C|$, then we expect that on an average query, only $$\sum_{i=1}^{K} S_i^2$$

will be scanned. The reason for this is that with probability Si, the query will come from Ci, and scanning Ci is equivalent to scanning a portion Si of the data.

Generally one expects that most queries in high dimension will come from the same distribution as the data itself Also, dimensions are not independent and some combinations of values may not be realistic. In a database of demographics, for example, one does not expect to see a find similar query on an entry for a record whose value for age is 3 and whose income is $50K. An advantage of practice of the invention is in a situation where data is not stable and a bad query is requested, the invention realizes the neareste neighbor may reside in many clusters and the process switches to a sequential scan of all the data in the database.

Testing of the Exemplary Embodiment

Figure 7:
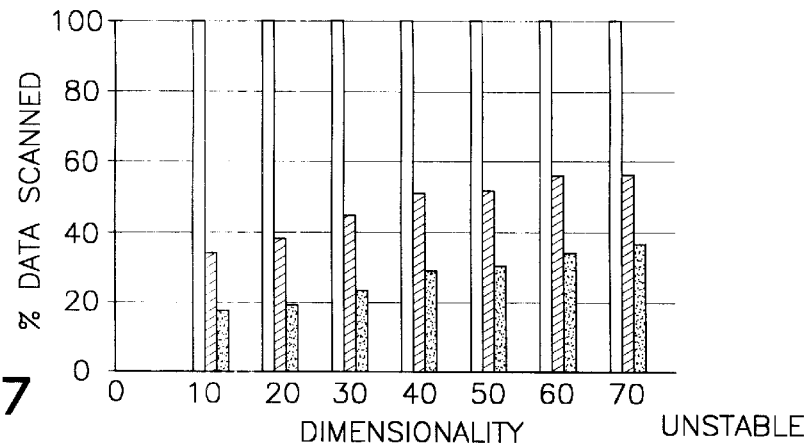
FIGS. 7 and 8 are tables illustrating nearest neighbor query results achieved through practice of an exemplary embodiment of the invention.
Figure 8:
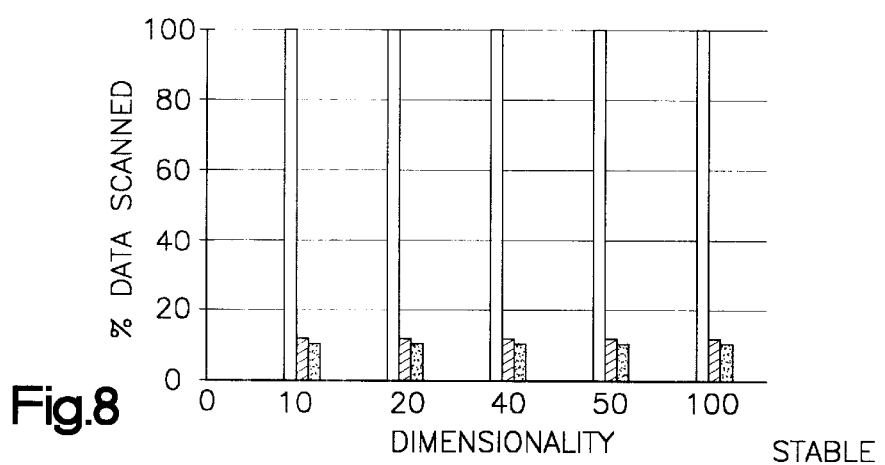

The tables of FIGS. 7 and 8 summarize results of a test of nearest-neighbor searches using an exemplary embodiment of the invention. The goal of these computations experiments was to confirm the validity of practice of the invention. Experiments were conducted with both synthetic and real world databases. The purpose of the synthetic databases was to study the behavior of the invention in well understood situations. The real data sets were examined to assure the assumptions were not too restrictive and apply in natural situations.

The synthetic data sets were drawn from a mixture of ten Gaussians. One on set of tests stable clusters were generated and then unstable clusters from a known generating model were used. Additionally, clusters from unknown generation models were used wherein the density model had to be estimated. What it means for the clusters to be stable and unstable are discussed in this application. Briefly, each Gaussian has a covarianace matrix $\sigma^2 I$ where I is the identity matrix. The dimensionality of the data is given by d and the distance between means or centroids of the clusters is $\tau_d$. If $\tau_d > \sigma(d)^{1/2}$, then the clusters are stable.

In one experiment, the size of the database was fixed and was chosen to be 500,000/d for d, the dimension was less than 100. For d greater than or equal to 100 the database size was 1,000,000/d. The process of finding the closest two neighbors to a given data point is performed for 250 query points randomly selected from the database. In every case the two nearest neighbors were found by examining only one cluster. In addition the process correctly determined that no additional clusters needed to be searched. Since each cluster contained ten percent of the data, each query required a scan of ten percent of the data. This test confirmed that when the clusters are stable and the model is known the process of finding nearest neighbors works very well.

To test how the process works when the clusters are unstable. The amount of overlap of the Gaussians that model the clusters grows exponentially as the number of dimensions increases. To evaluate how well the invention works in such a situation, the databases that were generated were first completely scanned to find the nearest neighbor and then the invention used to find the nearest neighbor. Scanning of the clusters stops once the process finds the known nearest neighbor. FIG. 7 tabulates the data. The figure also tabulates an idealized value based not upon how much of the database must be scanned but the probability based predictor that enough data has been scanned to assure with a tolerance that the correct nearest neighbor data point has been found.

Since the data gathered in FIG. 7 was from an unstable situation, one would expect the process to require a scan of much of the database. The chart below provides the percentage of time an error occurred in finding the nearest neighbor, i.e. the estimated nearest neighbor distance exceeded the actual nearest neighbor distance.

| Dimension | 10 | 20 | 30 | 40 | 50 | 60 | 70 |
|---|---|---|---|---|---|---|---|
| Accuracy | 98.8 | 96.4 | 93.6 | 93.2 | 94.8 | 96.4 | 92.4 |

As seen in FIG. 7, the percentage of the data scanned increased gradually with dimensionality. The ideal process predicted by theory scanned less data. This difference between the ideal process and the present invention indicates the invention probability estimate is conservative. In the experiments summarized in FIG. 8, the data were generated from ten Gaussians with means or centroids independently and identically distributed in each dimension from a uniform distribution. Each diagonal element of the covariance matrix Σ was generated from a uniform distribution. The data is therefore well separated and should be somewhat stable. Clusters that were used were generated using the EM process of Fayyad et al without using knowledge of the data generating distribution except that the number of clusters was known and used in the clustering. The results of the test on 10 to 100 dimensions are given in FIG. 8. The distribution is stable in practice and the two nearest neighbors were located in the first clusters and scanning was stopped.

The testing summarized by these Figures show how much savings is achieved by scanning the clusters in order of their likelihood of containing a nearest neighbor and then stopping when the nearest neighbor is found with high confidence. Note, even if more that one cluster is scanned to find the nearest neighbor, there is still a substantial savings over performing a scan of the entire database. The data in these tables confirms a significant benefit is achieved by clustering data in a large database if query by example or nearest-neighbor queries are to be performed.

Alternative Embodiment

Figure 6A:
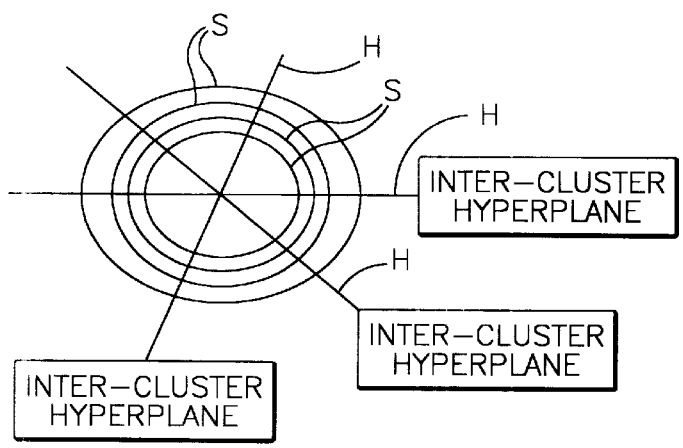
FIGS. 6A and 6B depict subdivisions of a cluster into segments in accordance with an alternative embodiment of the invention.
Figure 6B:
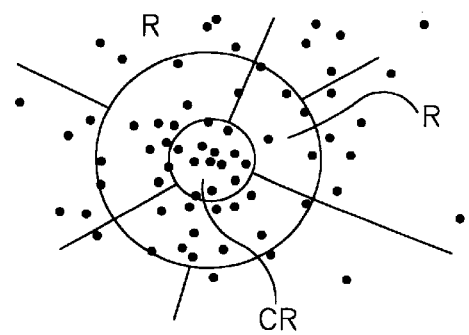

Further efficiency can be obtained through careful organization of the data within each cluster or region. In an alternative embodiment of the invention, instead of scanning an entire cluster to find the nearest neighbor, the process scans part of a cluster and then determines the next part of a cluster to scan (either another part of same cluster, or part of some other cluster). The diagram of FIG. 6A shows data points in 2 dimensions. In the alternative embodiment of FIG. 6A, one only needs to visit "slices" of a cluster.

Slicing of the clusters is performed by defining mutual hyperplanes and equiprobability regions. The cluster slicing process is performed by slicing each cluster into a set of iso-probability regions S (shells or donuts), and then using inter-cluster hyperplanes H to cut them further into subregions. FIG. 6A shows an example of slicing one cluster into 6 inter-cluster plane regions, and into an additional 5 iso-probability slices, giving 30 parts of the cluster.

Data can also be ordered within a particular cluster. The present invention is based upon the premise that it is possible to exploit the structure in data when data is clustered. Within a cluster one can ask how the data should be scanned. This issue is one of practical database management since data will have to be laid out on disk pages. It should be possible to use a stopping criteria within a cluster and avoid scanning all pages.

Consider a query point that happens to be near the center of a cluster. Clearly the data near the center should be scanned, while data within the cluster but further from the center may not have to be scanned. This suggests a disk organization that is similar to the one illustrated in FIG. 6B. The rational behind such a layout is that regions R get bigger as they get farther from the center of the cluster. Furthermore, the central region CR should not be partitioned finely since theory suggests that data points close to the center are indistinguishable from each other by distance: i.e. they are all essentially equidistant from a query.

Exemplary Data Processing System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

We claim:

1. A method for evaluating data records contained within a database wherein each record has multiple data attributes; the method comprising the steps of:
   a) clustering the data records contained in the database into multiple data clusters wherein each of the multiple data clusters is characterized by a cluster model; and
   b) building a new database of records having an augmented record format that contains the original record attributes and an additional record attribute containing a cluster identifier for each record based on the clustering step.

2. The method of claim 1 wherein the cluster model includes a) a number of data records associated with that cluster, b) centroids for each attribute of the cluster model and c) a spread for each attribute of the cluster model.

3. The method of claim 1 additionally comprising the step of indexing the records in the database on the additional record attribute.

4. The method of claim 1 additionally comprising the step of finding a nearest neighbor of a query data record by evaluating database records indexed by means of the cluster identifiers found during the clustering step.

5. The method of claim 4 wherein the step of finding the nearest neighbor is performed by evaluating a probability estimate based upon a cluster model for the clusters that is created during the clustering step.

6. The method of claim 5 wherein the step of finding the nearest neighbor is performed by scanning the database records indexed by cluster identifiers having a greatest probability of containing a nearest neighbor.

7. The method of claim 6 wherein the step of scanning database records is performed for data records indexed on multiple cluster identifiers so long as a probability of finding a nearest neighbor within a cluster exceeds a threshold.

8. The method of claim 1 wherein the clustering process is performed using a scalable clustering process wherein a portion of the database is brought into a rapid access memory prior to clustering and then a portion of the data brought into the rapid access memory is summarized to allow other data records to be brought into memory for further clustering analysis.

9. The method of claim 1 wherein the number of data attributes is greater than 10.

10. The method of claim 4 wherein the step of finding the nearest neighbor is based upon quadratic distance metric between the query data record and the database records indexed by the cluster identifier.

11. A method for evaluating data records stored on a storage medium wherein each record has multiple data attributes that have been characterized by a probability function found by clustering the data in the database to produce a clustering model; said method comprising the steps of assigning a cluster number for each of the records on the storage medium based upon the probability function, and finding a nearest neighbor from the data records for a query record by scanning data records from more than one based upon the probability function of the cluster model used to assign cluster numbers to the data records.

12. The method of claim 11 wherein records having the same index are written to a single file on the storage medium.

13. The method of claim 11 wherein the records are stored by a database management system and the index is used to form a record attribute of records stored within a database maintained on the storage medium.

14. The method of claim 11 wherein the clustering model for the database defines a probability function that is a mixture of Gaussians.

15. The method of claim 14 wherein the assigning of a cluster number comprises a Bayes decision for assigning each data record to a data cluster associated with one of said Gaussians.

16. The method of claim 11 wherein further comprising the step of subdividing data records within each cluster into cluster subcomponents and additionally comprising the step of finding a nearest neighbor of a query data by scanning records from a cluster subcomponent.

17. The method of claim 11 wherein the step of determining a nearest neighbor comprises the step determining a distance between the query data record and data records accessed in the database by means of the database index.

18. The method of claim 11 wherein a multiple number of data records are stored as a set of nearest neighbors.

19. The method of claim 11 wherein the nearest neighbor determination is based on a distance determination between a query record and a data record that comprises a quadratic normal form of distance.

20. The method of claim 11 wherein the storage medium stores a database of data records and further comprises a step of finding a nearest neighbor to a query record from the data records of the database, said step of finding the nearest neighbor comprising the step of choosing between a sequential scan of the database to find the nearest neighbor or searching for the nearest neighbor using the index derived from the probability function thereby optimizing the step of finding the nearest neighbor.

21. A process for use in answering queries comprising the steps of:
   a) clustering data stored in a database using a clustering technique to provide an estimate of the probability density function of the sample data;
   b) adding an additional column attribute to the database that represents the predicted cluster membership for each data record within the database; and
   c) rebuilding a data table of the database using the newly added column as an index to records in the table.

22. The process of claim 21 wherein an index for the data in the database is created on the additional column.

23. The process of claim 21 comprising the additional step of performing a nearest neighbor query to identify a nearest neighbor data point to a query data point.

24. The process of claim 22 wherein the nearest neighbor query is performed by finding a nearest cluster to the query data point.

25. The process of claim 24 additionally comprising the step of scanning data in a cluster identified as most likely to contain nearest neighbor based on a probability estimate for said cluster.

26. The process of claim 25 wherein if the probability that the nearest neighbor estimate is correct is above a certain threshold, the scanning is stopped, but if it is not, then scanning additional clusters to find the nearest neighbor.

27. In a computer data mining system, apparatus for evaluating data in a database comprising:
   a) one or more data storage devices for storing data records on a storage medium; the data records including data attributes; and
   b) a computer having a rapid access memory and an interface to the storage devices for reading data from the storage medium and bringing the data records from the storage medium into the rapid access memory for subsequent evaluation;
   c) the computer comprising a processing unit for evaluating at least some of the data records and for determining a probability density function for the records based on a clustering of data from data in the database into multiple numbers of data clusters, and said computer programmed to build an index for the data records in the database based on the probability density function, wherein said computer performs an approximate nearest neighbor analysis by choosing a specified cluster based on the index and evaluating records of the specified cluster for nearness to a given data record.

28. The apparatus of claim 27 wherein said computer stores data records having a common index based on cluster number in a file of records not part of database table.

29. The apparatus of claim 27 wherein the computer includes a database management component for setting up a database and using the index to organize data records in the database.

30. The apparatus of claim 29 wherein the computer builds an additional database of records for storage on the one or more data storage devices and wherein the data records of the additional database are augmented with a cluster attribute.

31. A computer-readable medium having computer-executable components comprising:
   a) a database component for interfacing with a database that stores data records made up of multiple data attributes;
   b) a modeling component for constructing and storing a clustering model that characterizes multiple data clusters wherein the modeling component constructs a model of data clustering that corresponds to a mixture of probability functions; and
   c) an analysis component for indexing the database on a cluster number for each record in the database wherein the indexing is performed based on a probability assessment of each record to the mixture of probability functions and for approximating a nearest neighbor query by determining an index for a sample record and scanning data records previously assigned a similar index.

32. The computer readable medium of claim 31 wherein said indexing component generates an augmented data record having a cluster number attribute for storage by the database component.

33. The computer readable medium of claim 31 wherein said modeling component is adapted to compare a new model to a previously constructed model to evaluate whether further of said data records should be moved from said database into said rapid access memory for modeling.

34. The computer readable medium of claim 31 wherein said modeling component is adapted to update said cluster model by calculating a weighted contribution by each of said data records in said rapid access memory.

35. A method for evaluating data records stored on a storage medium wherein each record has multiple data attributes that have been clustered to define a probability function of the data records stored on the storage medium; said method comprising the steps of evaluating the clusters of a clustering model and if the cluster separation between cluster centroids is of a sufficient size, assigning an index for each of the records on the storage medium based upon the probability function that is derived from the clustering model.

36. A method for evaluating data records stored on a storage medium wherein each record has multiple data attributes that have been characterized by a probability function found by clustering the data in the database to produce a clustering model; said method comprising the steps of assigning a cluster number for each of the records on the storage medium based upon the probability function, and finding a nearest neighbor from the data records for a query record by choosing between a scan of a subset of the database and a complete scan of the database based on the probability estimate generated by a statistical model of the data.

37. A method for performing an approximate nearest neighbor search of data records in a database stored on a storage medium wherein each record has multiple data attributes comprising:
 a) clustering the data records to define a cluster model having multiple clusters made up of probability functions to form a compressed characterization of the data records of the database;
 b) assigning clusters numbers as indexes to the data records based on the probability functions; and
 c) searching data records from a cluster to find a nearest neighbor within said cluster of a sample data record based on a nearness of the sample data record to the clusters that make up the cluster model.

38. The method of claim 37 wherein records from multiple numbers of clusters are searched to find a nearest neighbor to a sample data record.

39. The method of claim 38 wherein the number of clusters searched is based on a probability that an actual nearest neighbor is contained within an as yet unscanned cluster.

* * * * *